April 14, 1964 P. P. SOROKIN 3,129,410
ELECTRON SPIN ECHO MEMORY SYSTEM
Filed Aug. 25, 1959 2 Sheets-Sheet 1
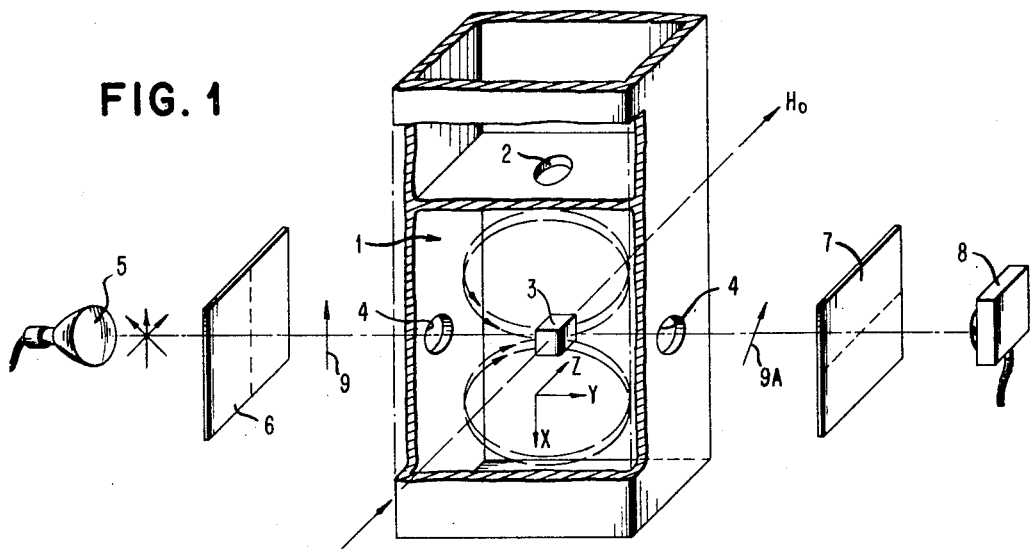
FIG. 1
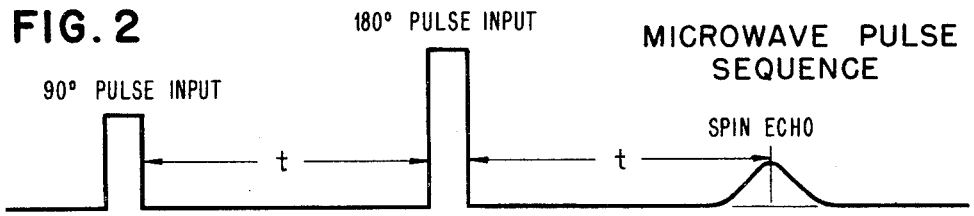
FIG. 2 — MICROWAVE PULSE SEQUENCE
90° PULSE INPUT, 180° PULSE INPUT, SPIN ECHO
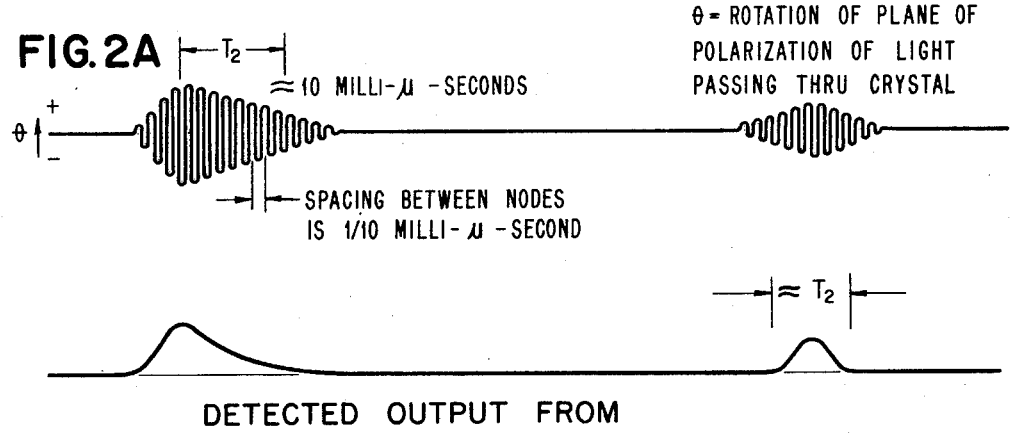
FIG. 2A
$\theta$ = ROTATION OF PLANE OF POLARIZATION OF LIGHT PASSING THRU CRYSTAL
≈ 10 MILLI-$\mu$-SECONDS
SPACING BETWEEN NODES IS 1/10 MILLI-$\mu$-SECOND
DETECTED OUTPUT FROM PHOTOMULTIPLIER
FIG. 2B
INVENTOR
PETER P. SOROKIN
BY
ATTORNEY GENERALIZED ENERGY LEVEL DIAGRAM FOR MATERIAL SHOWING FARADAY EFFECT FOR SPIN ECHO DETECTION ENERGY LEVEL DIAGRAM FOR $Gd^{+++}$ ZEEMAN SPLITTING OF GROUND AND EXCITED STATES IN $Gd^{+++}$ United States Patent Office 3,129,410
Patented Apr. 14, 1964

3,129,410
ELECTRON SPIN ECHO MEMORY SYSTEM
Peter P. Sorokin, Poughkeepsie, N.Y., assignor to International Business Machines Corporation, New York, N.Y., a corporation of New York
Filed Aug. 25, 1959, Ser. No. 835,891
2 Claims. (Cl. 340—173)

This invention relates to memory systems based upon electron spin echoes and more particularly to a method and apparatus for optical interrogation of the presence of electron spin echo signals.

Previously, electron spin echoes have been detected using a microwave receiver tuned to the frequency of the echo signals emanating from the sample, as is fully described in the copending application of the same inventor, Serial Number 780,518, filed December 15, 1958 and assigned to the same assignee as the present invention. In the technique described in the aforementioned copending application, degenerate resonant elements having input and output modes orthogonal to each other were used in order to prevent any portion of the input signal from reaching the receiver along with the spin echo signals.

What is described herein is a novel method and apparatus for detection of electron spin echo signals which achieves a complete isolation of the microwave input and spin echo output signals. The readout scheme provided herein utilizes optical rather than electronic detection of the spin echoes. The interrogation technique is based upon the observation that an electron spin echo signal will rotate the plane of polarization of a linearly polarized light beam which is applied in the direction of the signal.

An object of the present invention, therefore, is to provide a new and improved electron spin echo memory system.

Still another object is to provide a method of optically detecting electron spin echoes.

A further object is to provide apparatus for optical detection of electron spin echoes wherein the input and output signals are completely isolated from each other.

Among the other objects is to design an electron spin echo memory system using a microwave resonant cavity having a low Q-value and possessing a high signal-to-noise ratio of the spin echoes being read out.

Another specific object is to provide a detection system for use in electron spin echo memory apparatus which does not require that the receiver be tuned to the Larmor frequency of the echo pulses.

A final specific object of the present invention is to provide apparatus for use in memory systems based upon storage of information by spin echo techniques which includes a microwave resonant element having electron spin echo sample therein, a mangetic field to align substantially all the rotating magnetic vectors in the sample in a given plane, a source of linearly polarized light directed to the sample perpendicular to said plane, a source of microwave energy operable to feed a sequence of microwave pulses into the resonant element to generate spin echoes therefrom in a direction parallel to the light beam, and also including light detection apparatus to detect changes of the plane of polarization of the light beam caused by the interaction between the echo and the beam to record the presence of the echoes.

In the drawings:
FIGURE 1 is a schematic drawing of apparatus constituting the electron spin echo memory system of the present invention.

FIGURE 2 shows a sequence of microwave pulses capable of generating spin echoes in an electron spin sample.

FIGURE 2A shows the effect upon the angle of the plane of polarization of the light beam caused by interaction between the echo signal and the light.

FIGURE 2B illustrates the corresponding output obtained from the light detector.

Figure 3:
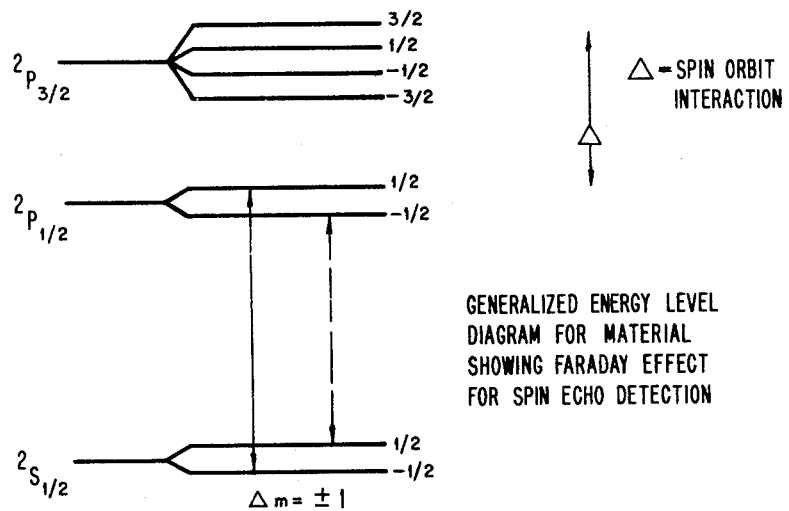
FIGURE 3 is a generalized energy level diagram for a material suitable for use in the electron spin echo detection system of the present invention.

Referring now to FIGURE 1 there is shown in highly schematic form an electron spin echo memory system having incorporated therein an optical interrogation scheme for detecting the presence of electron spin echoes. The system includes a microwave resonant cavity 1, held below 4° K. by immersion in a helium cryostat, and provided with microwave input port 2 through which microwave pulses may be applied sequentially to the sample 3. An external magnetic field, $H_0$, is applied to the sample in the direction shown by the arrows to align the spins in the direction of the field. The cavity is designed to resonate so that a microwave field or "information pulse" having a frequency equal to the characteristic Larmor frequency of the substance at the particular magnitude of the magnetic field may be applied at right angles to the field. The information pulse applies a torque to the magnetic moment which causes it to be turned away from the direction of the field. After the pulse is removed the electron spins precess about the field, generating components of magnetization making an angle with the direction of $H_0$, such as at 90°.

The resonant cavity is also provided with light input port 4 through which a source of linearly polarized light radiation may be directed through the sample so as to interact with the components of magnetization along the crystal axis. The optical system comprises a natural light source 5, a polarizer 6, analyzer 7 and a light detector, such as photomultiplier 8. The polarizer may be a Nicol prism or a sheet of polaroid film. The dotted line across the polarizer indicates the direction of the electric vector of the transmitted light and corresponds to the arrow shown as 9. When a sequence of microwave pulses which can generate spin echoes in the sample is applied to the cavity, the plane of polarization of the light beam oscillates each time an echo appears. The degree of rotation, as indicated by the arrow 9A, from the equilibrium direction is in the order of 40° or more. The crossed analyzer 7 at the receiving end of the optical system is adjusted to null out the light in the absence of microwave power fed to the cavity. Thereupon each time a suitable component of magnetization, i.e., a spin echo appears, a pulse of light escapes from the system and is then detected by the photo multiplier.

Many different designs of resonant cavities may be used as long as they satisfy the criterion described above, namely that they produce a tipping field at right angles to the spin orientation. A cavity resonant in the $TE_{210}$ mode, for example, is quite suitable. The Z dimension of the cavity may remain as small as desired, to the order of 1 mm., corresponding to a Q-value of 50, or pulses of 7 millimicroseconds duration. These cavities may be used in the detection scheme proposed herein without deteriorating the signal-to-noise ratios of the spin echoes being read out, since in this system the detected signal does not depend on the Q of the microwave cavities.

In general, the pulsing sequence for information storage and recollection shown in FIGURE 2, follows the conventional pattern of nuclear resonant systems. The 90° pulse tips the magnetization of the sample away from the direction of $H_0$ producing a component of magnetization in the Y—Z plane. The sample is then subjected to another microwave field, or 180° pulse, directed normal to the main field. After a quiescient period, the sample develops a magnetic moment of its own, called a "spin echo" which is directed normal to the main field.

In the electron spin echo system of the present invention the spin echoes thus produced are caused to interact with the polarized light beam in the following manner:

At the moment an echo is produced the populations of the two degenerate levels of the ground state, e.g. $Sy=+1/2$, $Sy=-1/2$, experience a sympathetic variation at the Larmor frequency of the spins. Thereupon, the two circularly polarized components of the incident light beam causing transitions from the ground state to higher energy levels are alternately absorbed and transmitted by the crystal. Thereupon the plane of polarization of the light beam oscillates in the manner depicted in FIGURE 2A. These oscillations, in turn, are detected by the photo-multiplier as the envelope of FIGURE 2B.

FIGURE 3 is a generalized energy level diagram for a material to be used in the optical interrogation system of the present invention. That portion of the spin system which is utilized is the $^2S_{1/2}$ ground state which is roughly degenerate and the $^2P_{1/2}$ upper level, the latter being split from the $^2S_{3/2}$ level by spin-orbit coupling in the crystal. The light frequency is made to correspond to the $^2P_{1/2} \leftrightarrow {}^2S_{1/2}$ transition. The selection rule of $\Delta m = \pm 1$ then requires that the two circularly polarized components of the light beam indicated by the solid and dotted lines in FIGURE 3 will cause only the transitions shown. When an echo signal is obtained the populations of the ground state spins are alternately interchanged causing one polarized component of the light to be absorbed at expense of the other, thus changing the plane of polarization.

Figure 4:
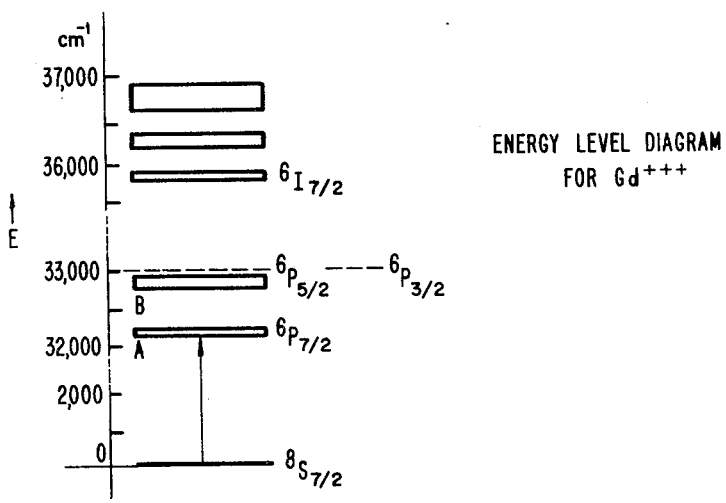
FIGURE 4 is another energy level diagram for $Gd^{+3}$ ion in a crystal of $LaCl_3 \cdot 7H_2O$.
Figure 4A:
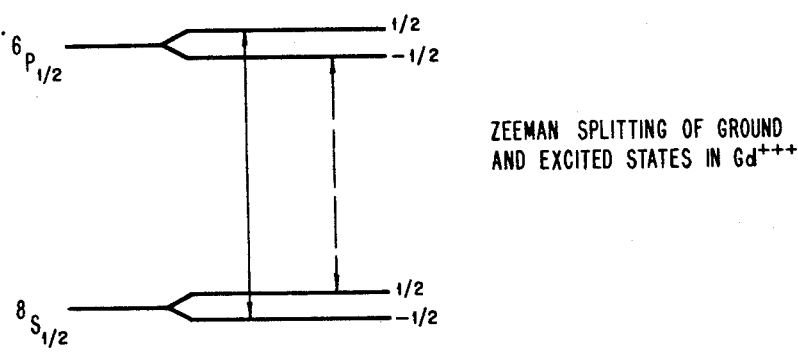
FIGURE 4A shows a detailed portion of the diagram of FIGURE 4.

FIGURE 4 shows the energy level diagram for a suitable material used as an electron spin echo sample in the detection system of the present invention, namely $Gd^{+3}$ ion in a crystal of $LaCl_3 \cdot 7H_2O$ or $GdCl_3 \cdot 6H_2O$. The light signal is adjusted to correspond to transitions between the ground state, $^8S_{7/2}$ and the first excited state, $^6P_{7/2}$. In operation, as illustrated in FIGURE 7A, the Zeeman levels of the ground and excited states are utilized for echo detection as in the manner described previously. High rotations, in the order of 60° or more when an echo is received, are obtainable using a sample containing about 0.01% $Gd^{+3}$ in a crystal of $LaCl_3 \cdot 7H_2O$.

The optical interrogation device utilized in an electron spin echo memory system described herein offers the definite advantage of not requiring the usual microwave receiver tuned to the Larmor frequency of the echo pulse. Furthermore the detection proposed herein occurs at light frequencies thus eliminating at once all problems connected with direct transmitter-receiver feed through.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An electron spin echo information storage system comprising a microwave resonant element having a microwave input port and light input and output ports and in which is placed an electron spin sample, magnetic field means to align substantially all the spins in the sample in a given plane, writing means to supply microwave input pulses to said element to generate electron spin echo components of magnetization transverse to said plane, optical interrogation means comprising means to supply linearly polarized light parallel to said transverse component of magnetization through said light input port and detection means associated with said light output port to sense changes in the angle of polarization caused by interaction between said light and said transverse component of magnetization.

2. The claim according to claim 1 wherein the electron spin sample is $LaCl_3 \cdot 7H_2O$ having present therein 0.01 percent of $Gd^{+3}$ ion.

References Cited in the file of this patent

UNITED STATES PATENTS

| | | |
|---|---|---|
| 2,485,839 | O'Dea | Oct. 25, 1949 |
| 2,705,790 | Hahn | Apr. 5, 1955 |
| 2,718,629 | Anderson | Sept. 20, 1955 |
| 2,974,568 | Dillon | Mar. 14, 1961 |

OTHER REFERENCES

"Propagation of Fields Through Ferrite Loaded Guides," M. L. Kales, Naval Research Lab., Proceedings of the Symposium on Modern Advances in Microwave Techniques, 1954, Copy in Scientific Library and Div. 7, pp. 215–229, 88–65.

Tele-Tech and Electronic Industries, November 1954, The Microwave Gyrator, Hogan, pp. 64–16, 137, 140.

"Modulation of a Light Beam by Precessing Absorbing Atoms," H. G. Dehmelt, Physical Review, vol. 105, No. 6, Mar. 15, 1957.

Literature Reference: "Researchers Explore Exotic Gyros," by James Holahan, Electronics Editor, Space Aero Electronics, May 1959, pp. 130–133, copy in 324–0.5(O).